United States Patent
Ferri et al.

(10) Patent No.: US 7,788,350 B2
(45) Date of Patent: *Aug. 31, 2010

(54) SOFTWARE DISTRIBUTION APPLICATION SUPPORTING OPERATING SYSTEM INSTALLATIONS

(75) Inventors: Luca Ferri, Rome (IT); Patrizia Manganelli, Rome (IT); Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 11/969,580

(22) Filed: Jan. 4, 2008

(65) Prior Publication Data

US 2008/0109542 A1  May 8, 2008

Related U.S. Application Data

(63) Continuation of application No. 10/876,025, filed on Jun. 24, 2004, now Pat. No. 7,350,201.

(51) Int. Cl.
*G06F 15/177* (2006.01)
(52) U.S. Cl. .................. 709/220; 713/1; 717/178
(58) Field of Classification Search ......... 709/220–222; 717/168–178; 713/1–2, 100
See application file for complete search history.

(56) References Cited

U.S. PATENT DOCUMENTS

| 5,793,982 A | 8/1998 | Shrader et al. |
| 5,867,713 A | 2/1999 | Shrader et al. |
| 5,870,611 A | 2/1999 | London Shrader et al. |
| 6,487,718 B1 | 11/2002 | Rodriguez et al. |
| 7,502,846 B2 * | 3/2009 | McCall et al. .............. 709/223 |
| 2002/0091805 A1 * | 7/2002 | Phillips et al. .............. 709/220 |

* cited by examiner

*Primary Examiner*—Salad Abdullahi
(74) *Attorney, Agent, or Firm*—Stephen R. Tkacs; Stephen J. Walder, Jr.; Jeffrey S. LaBaw

(57) ABSTRACT

A software distribution application supporting the installation of operating systems on pristine computers is proposed. A new configuration element is added for virtually defining an operating system; the configuration element points to a corresponding image of the operating system on different pristine servers. Moreover, the pristine computers can be defined in a target database before they actually exist; each pristine computer subscribes to a reference model specifying the installation of the operating system. A plan is then generated with actions for installing the operating system on the pristine computers. When the plan is submitted for execution, a plug-in module associates each pristine computer with the image of the operating system on the respective pristine server. In this way, as soon as a pristine computer is turned on and transmits a remote installation request to the pristine server the associated image is automatically installed.

19 Claims, 8 Drawing Sheets

SOFTWARE DISTRIBUTION APPLICATION SUPPORTING OPERATING SYSTEM INSTALLATIONS

This application is a continuation of application Ser. No. 10/876,025, filed Jun. 24, 2004 now U.S. Pat. No. 7,350,201, status allowed.

TECHNICAL FIELD

The present invention relates to the data processing field, and more specifically to a method and a corresponding system for distributing software configurations in a data processing system.

BACKGROUND ART

Managing configuration changes in a data processing system is a time consuming activity, particularly when the system includes a great number of target computers to which new software products must be distributed. A typical example is that of a large network with hundreds of workstations where software products are periodically upgraded in order to be abreast of the information technology development.

Software distribution applications have been proposed in the last years to assist a system administrator in efficiently managing deployment of software products from a central site of the system. An example of software distribution application is the "Tivoli Configuration Manager" by IBM Corporation. Typically, a configuration server controls building of packages including instructions that specify the actions to be carried out on the target computers for installing or removing selected software products. The packages are transmitted to the target computers; the corresponding instructions are then interpreted so as to enforce the desired software configuration.

The software distribution applications require an agent to run on each target computer for interacting with the configuration server. Therefore, the target computer must be properly configured before being able to participate in the software distribution process. As a consequence, the software distribution applications known in the art are unable to manage bare-metal machines with no operating system installed or failed computers needing to have the operating system restored (commonly referred to as pristine computers).

Some operating system installation applications are also available for allowing the administrator to setup pristine computers remotely. An example of operating system installation application is the "Remote Installation Service (RIS)" by Microsoft Corporation. Typically, the pristine computers are enabled to request a remote bootstrap when turned on; the request is received by an installation server, which downloads an image of the desired operating system to the pristine computer and controls its installation.

However, the configuration of the pristine computers remains a challenging and costly activity. Indeed, the process at first requires the setup of each pristine computer under the control of the installation server. An intervention on-site is then required to install the configuration agent on the computer. Only now can the distribution server address the computer for the installation of the desired products.

An additional drawback is that operation of the above-described operating system installation applications is bound to the physical characteristics of the images to be installed.

Moreover, the operating system installation applications known in the art offer no support for managing complex operations (such as the scheduling of the installation activities or the definition of abstract models for the target computers).

SUMMARY OF THE INVENTION

In one illustrative embodiment, a computer program product comprises a computer useable medium having a computer readable program. The computer readable program, when executed in a data processing system, causes the data processing system to define a configuration element for an operating system. The configuration element is an operating system element that specifies properties of the operating system on a pristine server. The computer readable program further causes the data processing system to define an action plan for applying the configuration element to a pristine target computer and associate the pristine target computer with an image of the operating system on the pristine server in response to a submission of the action plan such that the pristine server installs the associated image of the operating system and a configuration agent on the pristine target computer to form an endpoint target computer. The computer readable program further causes the data processing system to define at least one further action for installing a software product on each endpoint target computer, detect a connection of the configuration agent of the endpoint target computer to the configuration server, enable submission of the at least one further action in response to detection of the connection, and instruct the configuration agent of the endpoint target computer to install the corresponding software product in response to a submission of the at least one further action.

In another illustrative embodiment, an apparatus in a configuration server data processing system for distributing software configurations comprises a configuration manager, in the configuration server data processing system, that is configured to receive a configuration element for an operating system. The configuration element is an operating system element that specifies properties of the operating system on a pristine server. The apparatus further comprises a sync engine, in the configuration server data processing system, that is configured to define an action plan for applying the configuration element to a pristine target computer and an execution manager, in the configuration server data processing system, that is configured to associate the pristine target computer with an image of the operating system on the pristine server in response to a submission of the action plan such that the pristine server installs the associated image of the operating system and a configuration agent on the pristine target computer to form an endpoint target computer. The configuration manager is configured to embed a configuration agent for interacting with the configuration server into each operating system image to be installed on a pristine target computer. The sync engine is configured to define at least one further action for installing a software product on each endpoint target computer. The apparatus further comprises an endpoint manager, in the configuration server data processing system, that is configured to detect a connection of the configuration agent of the endpoint target computer to the configuration server, to enable submission of the at least one further action in response to detection of the connection, and to instruct the configuration agent of the endpoint target computer to install the corresponding software product in response to a submission of the at least one further action.

In another illustrative embodiment, a configuration server for distributing software configurations in a data processing system comprises a processor and a memory coupled to the processor. The memory comprises instructions which, when executed by the processor, cause the processor to define a configuration element for an operating system. The configuration element is an operating system element that specifies properties of the operating system on a pristine server. The instructions further cause the processor to define an action plan for applying the configuration element to a pristine target computer and associate the pristine target computer with an image of the operating system on the pristine server in response to a submission of the action plan such that the pristine server installs the associated image of the operating system and a configuration agent on the pristine target computer to form an endpoint target computer.

In another illustrative embodiment, a method for distributing software configurations in a data processing system comprises defining a configuration element for an operating system on a configuration server. The configuration element is an operating system element that specifies properties of the operating system on a pristine server. The method further comprises defining an action plan on the configuration server for applying the configuration element to a pristine target computer and associating the pristine target computer with an image of the operating system on the pristine server in response to a submission of the action plan, such that the pristine server installs the associated image of the operating system and a configuration agent on the pristine target computer to form an endpoint target computer.

In another illustrative embodiment, a computer program product comprises a computer useable medium having a computer readable program. The computer readable program, when executed in a data processing system, causes the data processing system to define a configuration element for an operating system on a configuration server. The configuration element is an operating system element that specifies properties of the operating system on a pristine server. The computer readable program further causes the data processing system to define an action plan on the configuration server for applying the configuration element to a pristine target computer and associate the pristine target computer with an image of the operating system on the pristine server in response to a submission of the action plan, such that the pristine server installs the associated image of the operating system and a configuration agent on the pristine target computer to form an endpoint target computer.

These and other features and advantages of the present invention will be described in, or will become apparent to those of ordinary skill in the art in view of, the following detailed description of the example embodiments of the present invention.

DETAILED DESCRIPTION OF THE PREFERRED EMBODIMENT

Figure 1A:
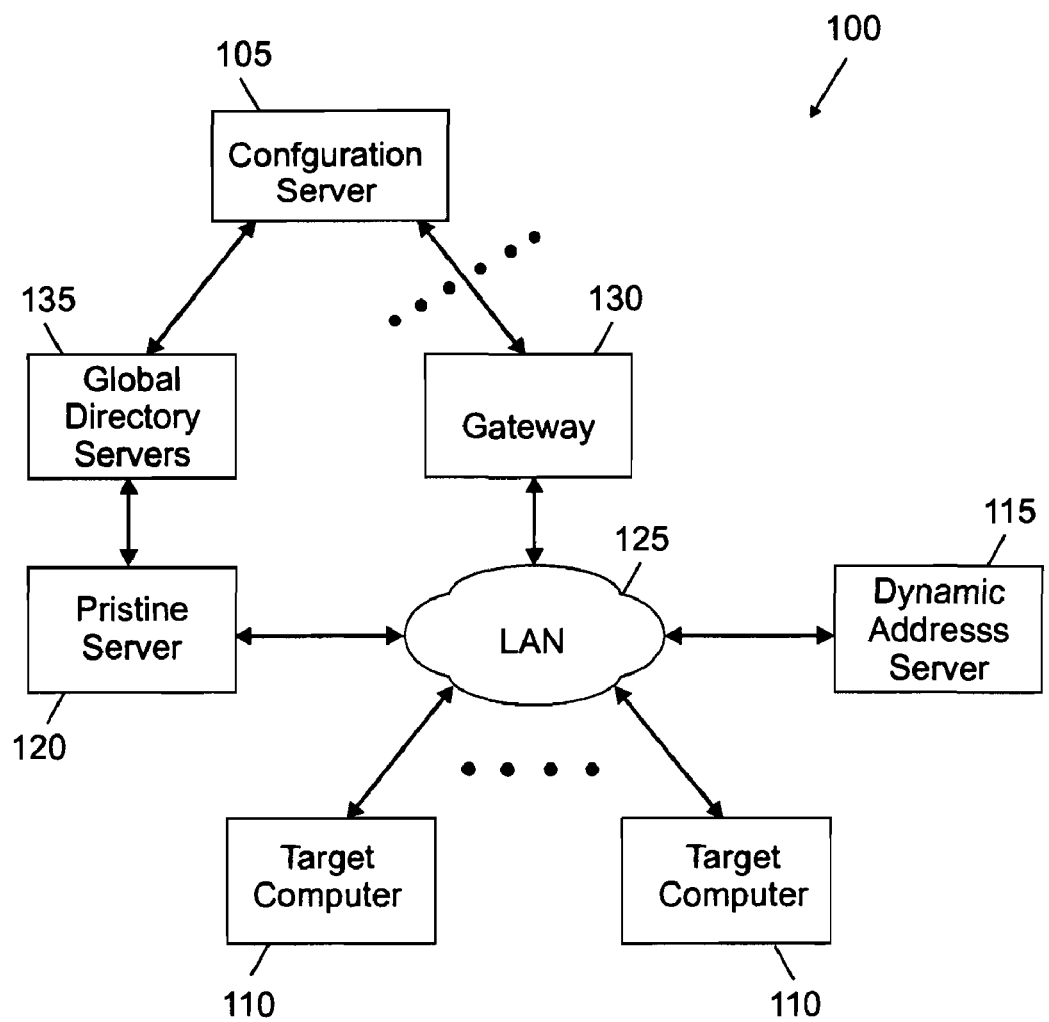
FIG. 1a is a schematic block diagram of a data processing system in which the method of the invention is applicable.

With reference in particular to FIG. 1a, a data processing system 100 with a distributed architecture is shown. The system 100 includes a configuration server 105, which is used to distribute software products to target computers 110. The target computers 110 are organized into domains. The target computers 110 of each domain can access a server 115 implementing a dynamic address service (for example, conforming to the DHCP specification). The domain further includes one or more pristine servers 120, which are used to install operating systems on the target computers 110. The computers of each domain (target computers 110, dynamic address server 115 and pristine server 120) communicate through a network 125 (for example, a LAN). A gateway 130 interfaces the computers connected to the network 125 with the outside of the domain, and in particular with the configuration server 105. The configuration server 105 and each pristine server 120 access one or more servers 135 implementing a global directory service (for example, conforming to the Active Directory specification).

Figure 1B:
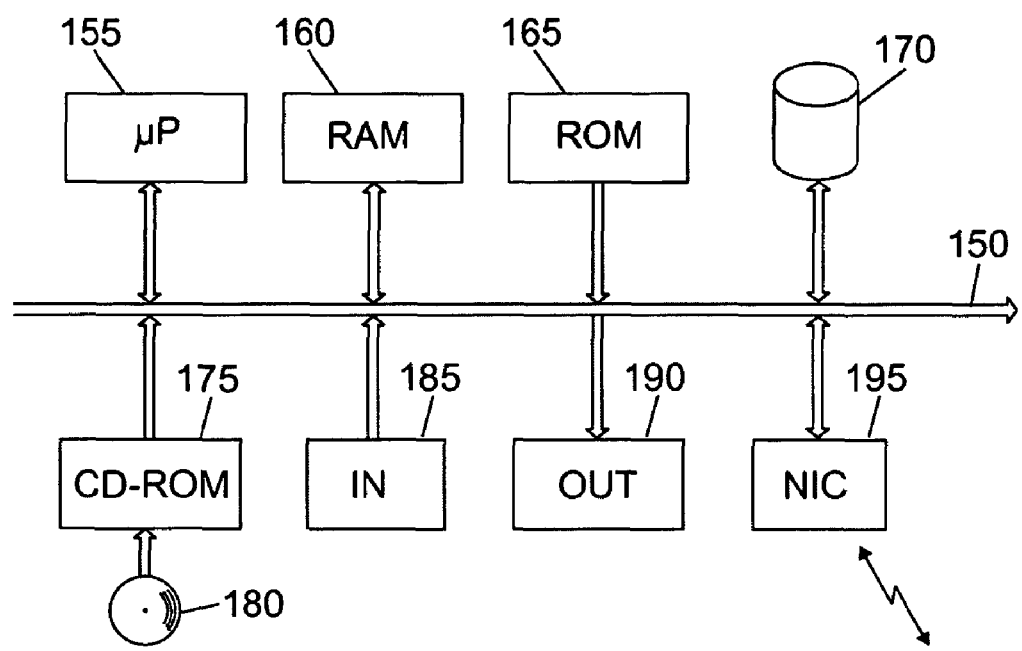
FIG. 1b shows the functional blocks of a generic computer of the system.

As shown in FIG. 1b, a generic computer of the system is formed by several units that are connected in parallel to a communication bus 150. In detail, one or more microprocessors (µP) 155 control operation of the computer, a RAM 160 is directly used as a working memory by the microprocessors 155, and a ROM 165 stores basic code for a bootstrap of the computer. Several peripheral units are further connected to the bus 150 (by means of respective interfaces). Particularly, a mass memory consists of a magnetic hard-disk 170 and a driver 175 for reading CD-ROMs 180. Moreover, the computer includes input devices 185 (for example, a keyboard and a mouse), and output devices 190 (for example, a monitor and a printer). A Network Interface Card (NIC) 195 is used to plug the computer into the system.

Similar considerations apply if the computers have a different structure or include equivalent units. Moreover, the concepts of the present invention are also applicable when the system has another topology or exploits equivalent services. Alternatively, two or more configuration servers are provided, each domain includes multiple pristine servers, or the pristine servers also implement the directory service.

Figure 2:
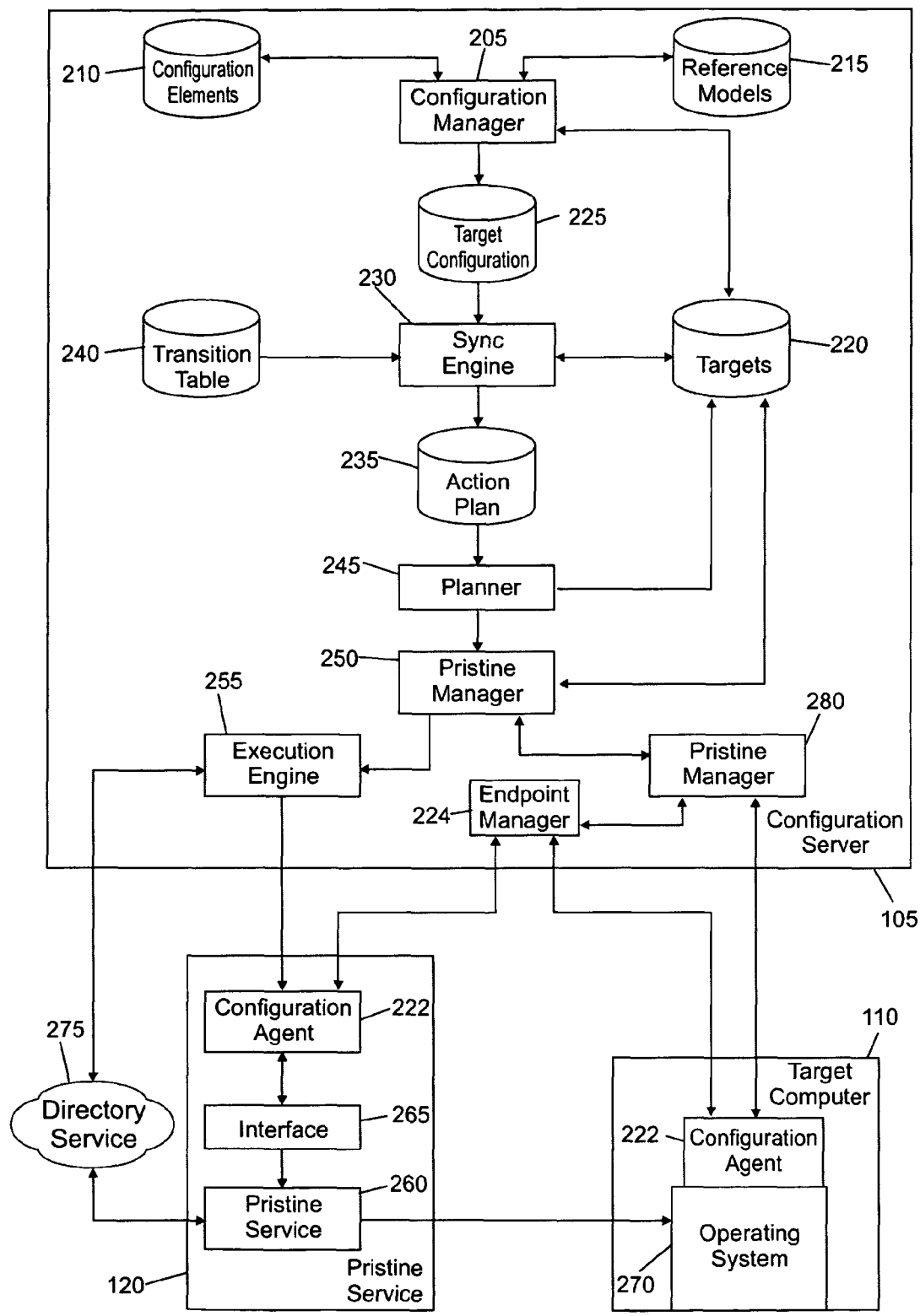
FIGS. 2-3 depict the main software components used for implementing the method.

Considering now FIG. 2, the main software components used for implementing a software distribution process in the above-described system are illustrated. The information (programs and data) is typically stored on the hard-disks of the different computers and loaded (at least partially) into the respective working memories when the programs are running. The programs are initially installed onto the hard disks from CD-ROMs.

The distribution process is controlled by a configuration manager 205 running on the corresponding server 105. The configuration manager 205 controls a repository 210 of configuration elements. Each configuration element represents a resource to be used during the distribution process; moreover, the configuration element specifies any dependency from other configuration elements. Usually, the configuration element defines a package for a corresponding (application) software product to be deployed. New configuration elements are added for virtually defining different operating systems. Each operating system element specifies properties of the operating system (such as its type and version, the required hardware platform, memory space, and hard-disk size); moreover, the operating system element points to a corresponding image on one or more pristine servers 120.

The configuration manager 205 further controls a repository 215 of reference models. Each reference model specifies the desired configuration of the target computers 110 subscribing to the reference model. For this purpose, the reference model indicates the desired target state of one or more configuration elements. The subscribers are defined by a role, which specifies a functional group of target computers 110 (for example, computers assigned to developers, secretaries, managers, and the like); the target computers 110 belonging to a generic role can be characterized either statically (for example, by means of a list) or dynamically (for example, by means of a query to be run on a specific database). A new role is added for target computers requiring the installation of an operating system (pristine computers).

A database 220 stores information about all the target computers 110 of the system. Usually, the target database 220 defines the computers, referred to as endpoint computers, which can be managed by the server 105. Each endpoint computer is identified by different properties (such as an owner, a serial number, a network address) and its current (hardware and software) configuration. The endpoint computer must be provided with a configuration agent 222 running in the background; all the endpoint computers currently active in the system are logged in an endpoint manager 224.

Each pristine server 120 is also configured as an endpoint computer; for this purpose, the configuration agent 222 is installed so as to allow the pristine server 120 to be controlled from the configuration server 105.

The target database 220 also supports the definition of the pristine computers before they actually exist. The pristine computers are identified according to the value of a corresponding attribute (which can be ignored by other standard operations). The pristine attribute also describes the behavior of the pristine computer during the installation of the operating system; for example, the pristine attribute indicates that the operating system is to be installed always, only in the case of a new version or only in the case of a different type. Conversely, the pristine attribute indicates that the operating system is not to be installed for target computers that are not of the pristine type. Each pristine computer is recognized by a hardware identifier (for example, its GUID). The pristine computer must be associated with one or more pristine servers 120. The definition of the pristine computer also includes a section for specifying runtime parameters that will be used during the installation of the operating system (for example, its security key, a label to be assigned to the target computer, and the like).

The configuration manager 205 generates a list 225 indicating a desired configuration for the subscribers (endpoint computers and/or pristine computers) of a selected reference model; more specifically, for each target computer 110 belonging to the role indicated in the reference model the target configuration list 225 specifies the target state of the configuration elements defined in the reference model.

The target configuration list 225 is supplied to a synchronization engine 230, which also accesses the target database 220. The synchronization engine 230 generates a plan 235, which specifies the actions to be performed on each target computer 110 (associated with the selected reference model) for reaching the desired configuration. For this purpose, the synchronization engine 230 exploits a transition table 240; for each configuration element and for each pair starting state/target state, the transition table 240 indicates the actions required to reach the target state from the starting state. Typically, the action plan will include pristine actions for installing the operating systems on the pristine computers and software distribution actions for installing the software products on the endpoint computers; all the software distribution actions are conditioned to the completion of the respective pristine action on the same target computer (either directly or indirectly).

The action plan 235 is submitted to a planner 245. Usually, the planner 245 controls execution of the software distribution actions on the endpoint computers (for example, instructing a source host computer to deploy software packages for their installation); moreover, the planner 245 updates the current configuration of the endpoint computers in the target database 220 accordingly.

A plug-in module 250 is added to the planner 245 for managing execution of the pristine actions on the pristine computers (as described in detail in the following); for this purpose, the pristine manager 250 accesses the target database 220. The pristine manager 250 controls an execution engine 255, which communicates with the pristine servers 120 to setup the installation of the operating system on the associated pristine computers 110. Particularly, the execution engine 255 dispatches commands to the configuration agent 222 installed on each pristine server 120. The configuration agent 222 is coupled with a pristine service 260 through an interface 265, which provides an additional layer of abstraction. The pristine service 260 directly controls the installation of the operating system (denoted with 270) and of the configuration agent 222 on each associated pristine computer 110, which then becomes a standard endpoint computer. Both the execution engine 255 and the pristine service 260 access a global directory service 275 (implemented by the corresponding servers) for managing the authorization of the pristine computers.

A completion agent 280 is active whenever the execution of pristine actions is pending. The completion agent 280 polls the endpoint manager 224 for detecting the logging of each new endpoint computer resulting from the pristine actions. The completion agent 280 also interfaces with the configuration agent 222 to perform a scan on the new endpoint computer. The completion agent 280 reports a result of the actions to the pristine manager 250, which updates the target database 220 accordingly.

Similar considerations apply if a whole application (consisting of the programs on the different computers) and the corresponding data are structured in another way, or if the programs are provided on equivalent computer readable media (such as a DVD). Moreover, the concepts of the present invention are also applicable when an inheritance mechanism is provided for the definition of the pristine computers in the target database, when the actions to be submitted are created directly without any reference models, or when different plug-in modules are provided for corresponding pristine service technologies. Alternatively, the completion of the pristine actions is detected querying the corresponding pristine servers, or no interface is provided between the pristine service and the configuration agent (assuming that the pristine service is already able to communicate with the configuration agent by means of its primitives).

Figure 3:
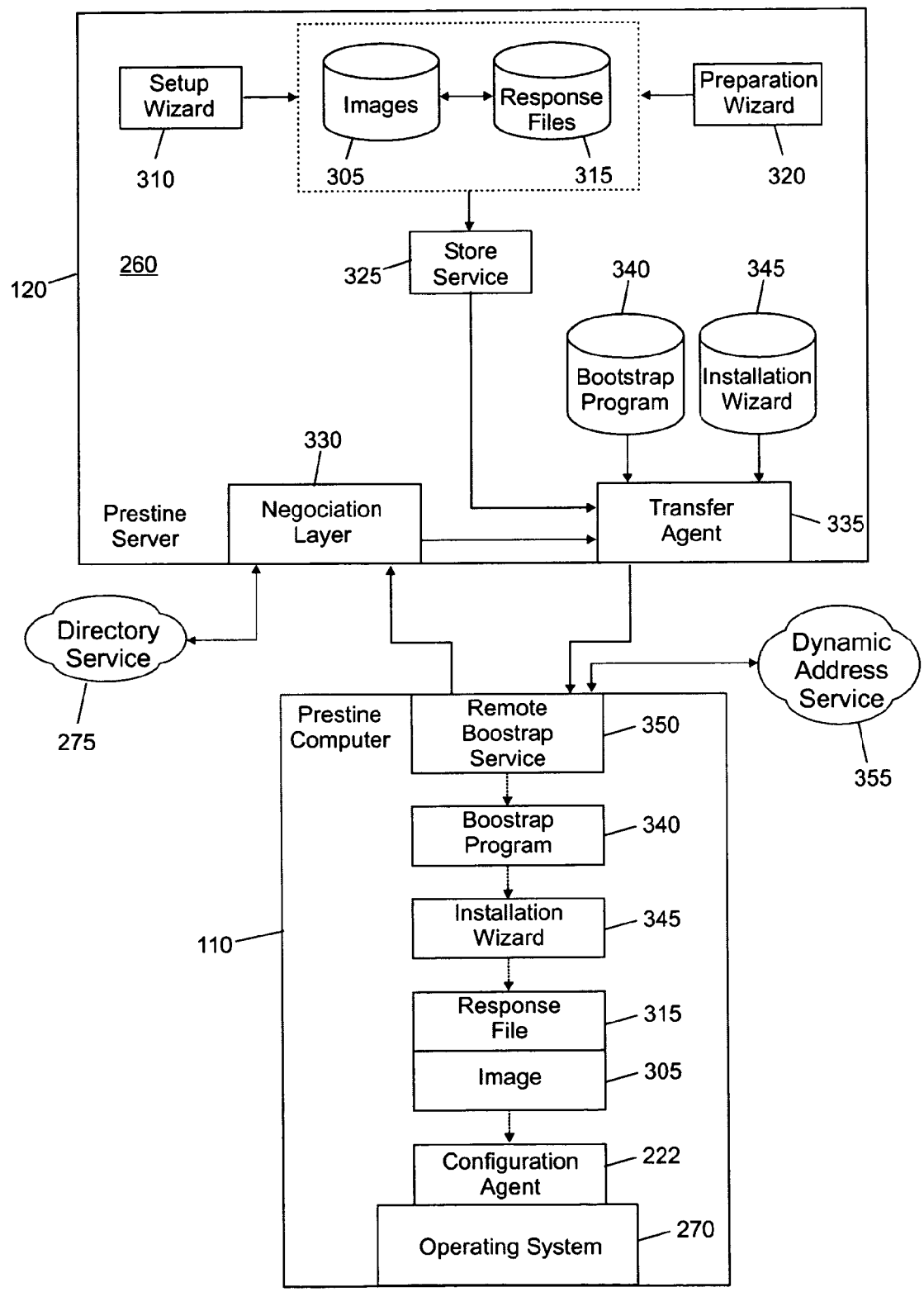
Figure 4A:
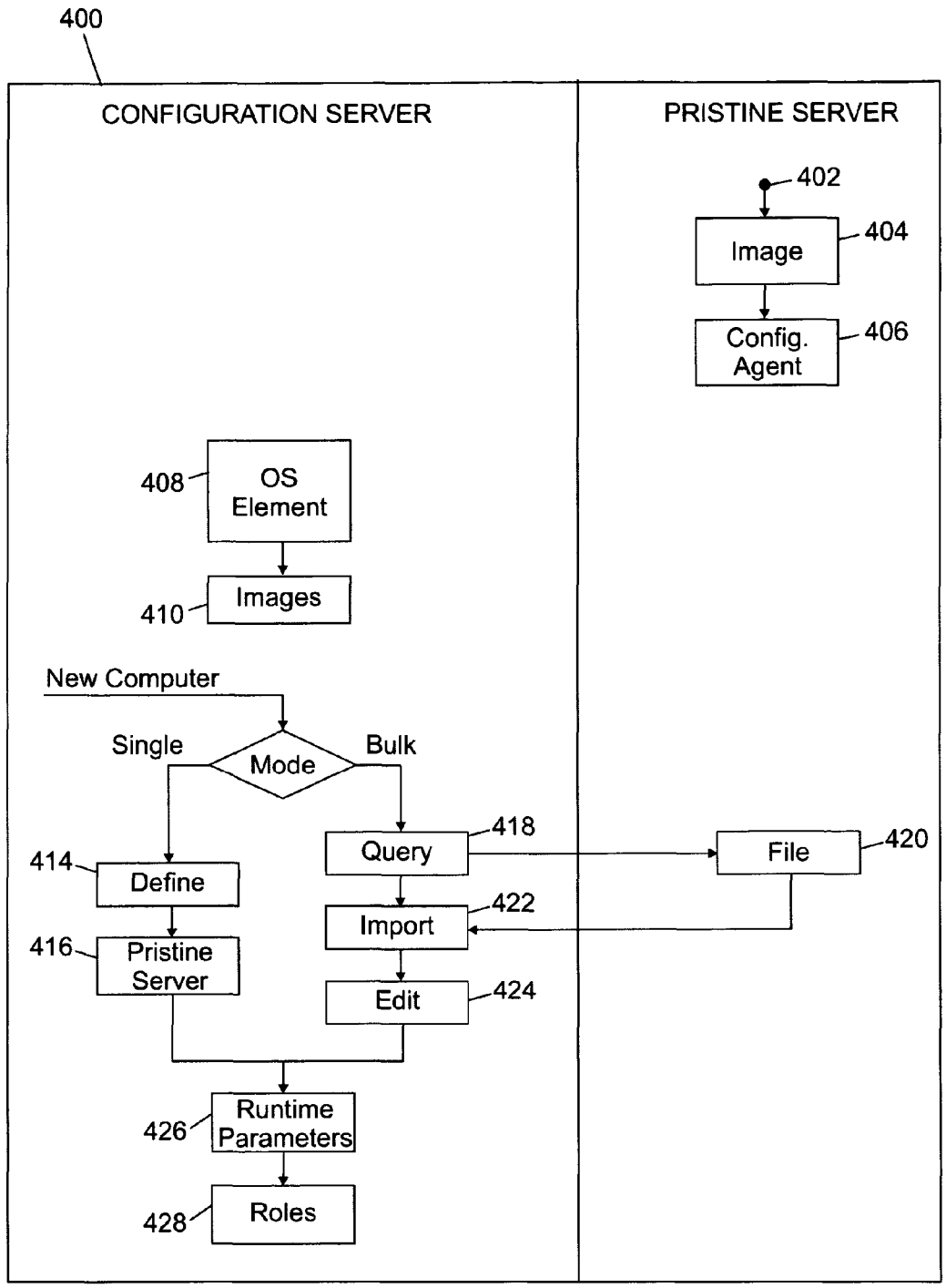
FIGS. 4a-4d show a diagram describing the flow of activities relating to an illustrative implementation of the method.
Figure 4B:
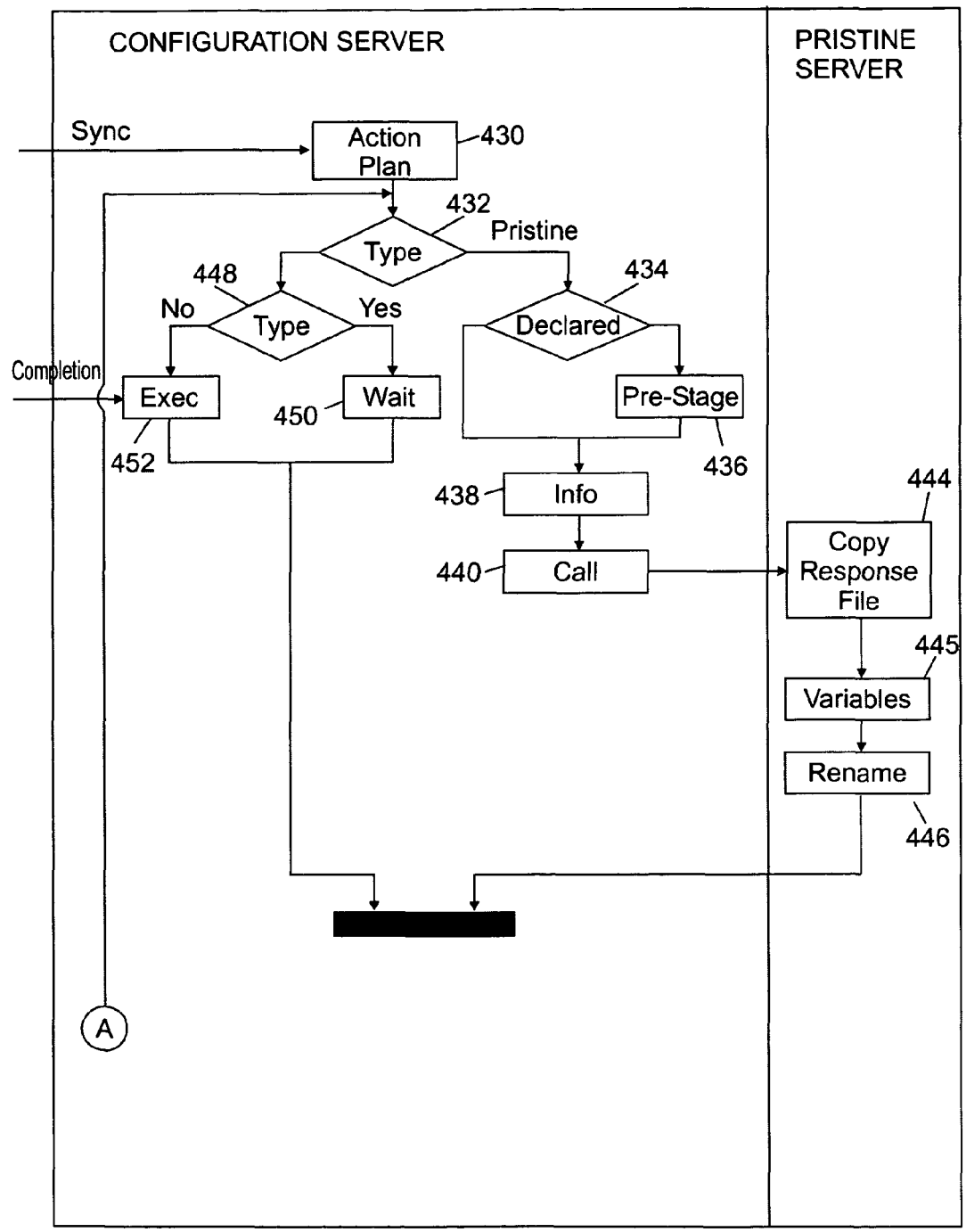
Figure 4C:
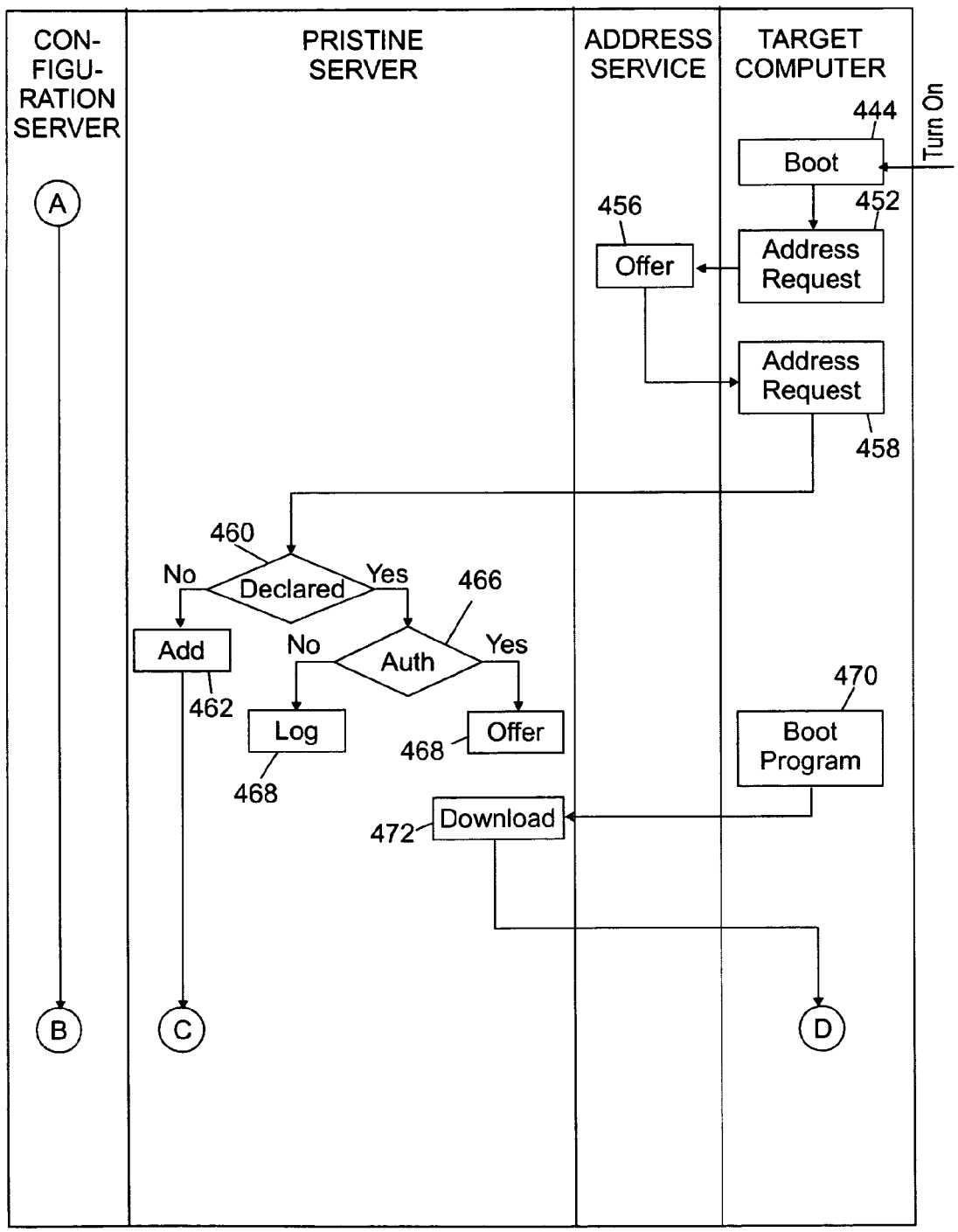
Figure 4D:
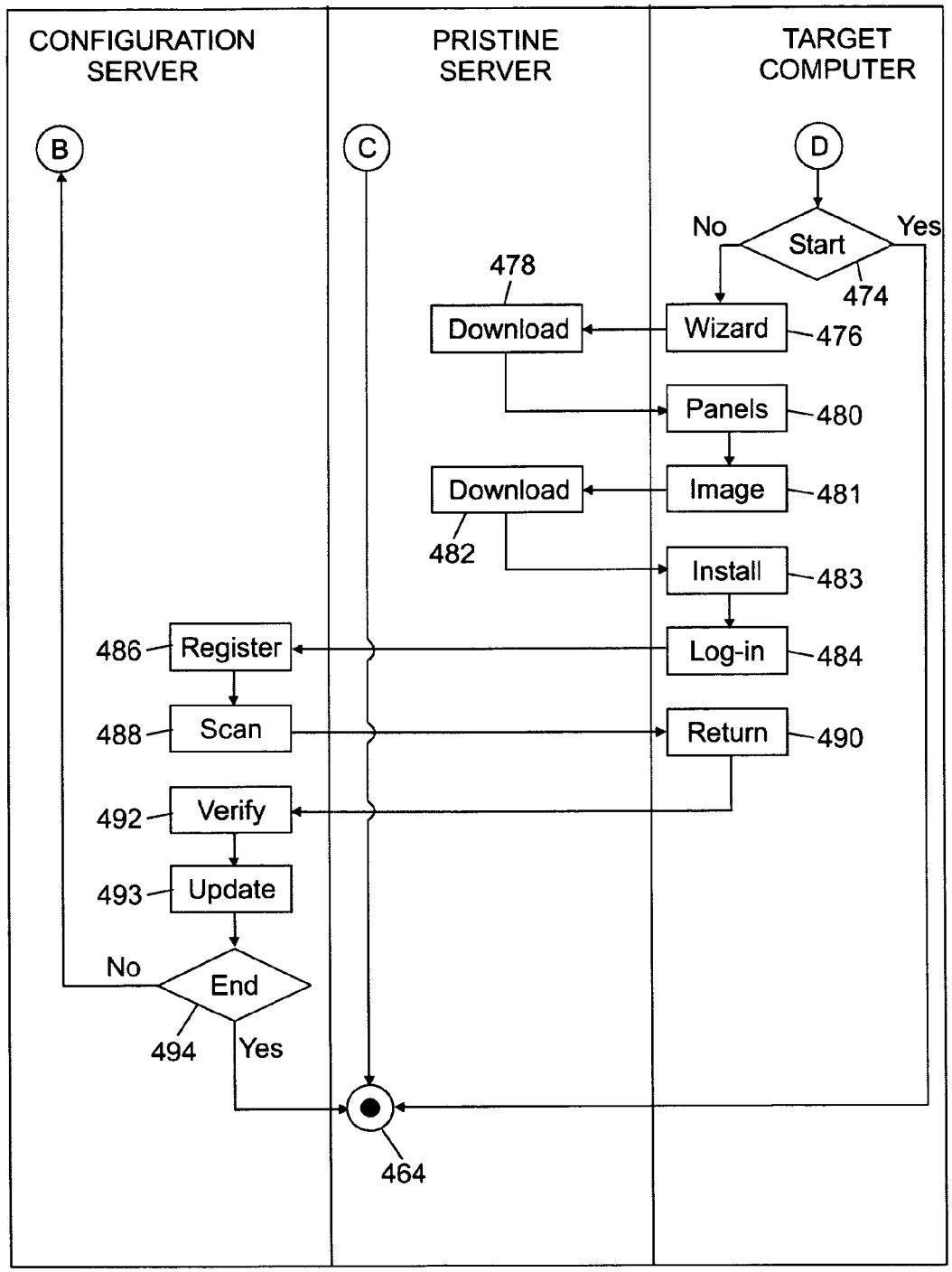

The main software components used for installing operating systems from a generic pristine server are detailed in FIG. 3.

The pristine service 260 (for example, based on the RIS technology) manages images 305 of different operating systems (or of the same operating system with different configurations). A setup wizard 310 is used to add native images 305 to the pristine server 120. Each native image 305 consists of a copy of the installation CD-ROMs of the operating system. The native image 305 is associated with one or more response files 315 (having the extension ".sif"). Each response file 315 includes parameters that are required during the installation of the operating system; the response file 315 can also include variables (identified by the signs % around them), which values must be entered before starting the installation of the operating system. A default response file 315 (called "Ristndrd.sif") is created for each native image 305. The default response file 315 can be customized; moreover, additional response files 315 can be defined and associated with each native image 305.

Alternatively, a preparation wizard 320 is used to create clone images 305. Each clone image 305 consists of a copy of the hard-disk of a donor computer (suitably updated to remove configuration information unique to the donor computer, such as its identifier). A default response file 315 (called "Riprep.sif") is likewise created for each clone image 305. The default response file 315 can be customized; in this case, however, no additional response files can be added.

The pristine service 260 is based on a user-bound model, wherein each image 305 is only available to selected users (identified by an account and a corresponding password). For this purpose, the access to each response file 315 is restricted to the desired users (or group of users); therefore, each user can only see the images 305 associated with the response files 315 which he/she has been authorized to.

A store tool 325 combines duplicated files of the different images 305 (so as to save hard-disk space). The store tool 325 includes an agent scanning the hard-disk when the pristine server 120 is not busy. Whenever that agent identifies identical files it creates a single copy thereof, which is renamed with a unique identifier (GUID) and the extension ".sis"; the identical files are then changed to point to their copy. In this way, when one of the original files is required, the request is redirected by the store tool 325 to the corresponding copy.

The pristine server 120 includes a negotiation layer 330 (for example, conforming to the BINL specification), which listens for and answers requests from each associated pristine computer 110. The negotiation layer 330 checks the directory service 275 to authenticate the pristine computer 110 or to create a corresponding new account. Moreover, the negotiation layer 330 controls a transfer agent 335 (for example, based on the TFTPD technology), which is used to download information to the pristine computer 110. For this purpose, the transfer agent 335 accesses a small bootstrap program 340 (called "Startrom.com"); the transfer agent 335 also accesses an installation wizard 345, which consists of a set of screen panels. Moreover, the transfer agent 335 receives selected response files 315 with the associated images 305 from the store tool 325.

On the other hand, each pristine computer 110 is provided with a remote bootstrap service 350 (for example, based on the PXE technology). Typically, the remote bootstrap service 350 is embedded in the network interface card of the pristine computer 110. The remote bootstrap service 350 exploits a dynamic address service 355 (implemented by the corresponding server) to obtain a dynamic address before contacting the pristine server 120. The remote bootstrap service 350 then sends requests to the negotiation layer 330 and receives information from the transfer agent 335.

A remote installation process involves the loading of different software components on the pristine computer 110. In detail, the first file that is downloaded from the pristine server 120 consists of the bootstrap program 340. The installation wizard 345 is then used to start the process guiding a user of the pristine computer 110 through the corresponding panels. The selected response file 315 and the associated image 305 are then used to install the desired operating system 270 and the configuration agent 222 on the pristine computer 110.

However, the concepts of the present invention are also applicable when the pristine sever is based on a different technology (such as ADS by Microsoft Corporation or RDM by IBM Corporation). Similar considerations apply if the remote bootstrap service is embedded in the ROM of the pristine computer or is provided on a floppy-disk created using a tool of the pristine service, if the images include pre-configured products, and the like.

As shown in FIGS. 4a-4d, the logic of operation of the above-described system implements a method 400 that begins at the black start circle 402 in the swim-lane of a generic pristine server. Whenever a new operating system is made available for installation, the method passes to block 404 wherein a new native image with the corresponding default response file is created (using the setup wizard); the default response file is then customized if necessary. Continuing to block 406, the image is updated embedding the files required for installing the configuration agent. With reference now to the swim-lane of the configuration server, a new operating system element is added at block 408 (specifying its properties). The process continues to block 410, wherein the operating system element is associated with the corresponding image on each pristine server.

Whenever a new pristine computer must be added to the system, the flow of activity descends into decision block 412; the process then branches according to the selected mode of operation of the configuration manager (for the definition of the pristine computer in the target database). If the configuration manager operates in a single mode the blocks 414-416 are executed, whereas if the configuration manager operates in a bulk mode the blocks 418-424 are executed; in both cases, the process merges again at block 426.

Considering in particular block 414 (single mode), the pristine computer is defined manually inserting the corresponding identifier and the required properties; the pristine attribute is set to a value indicating the behavior of the target computer in the pristine role (i.e., a value different from "non-install"). The method then passes to block 416, wherein the pristine computer is associated with the respective pristine server.

With reference now to block 418 (bulk mode), the configuration manager queries one or more selected pristine servers for information about the associated pristine computers. In response thereto, the pristine server at block 420 retrieves the identifier of each pristine computer and any available properties from the directory service; a corresponding file (for example, in the CSV format) is created and returned to the configuration manager. Referring back to the swim-lane of the configuration server, a series of new pristine computers are created at block 422 importing that file (skipping any pristine computer already defined in the target database); at the same time, each new pristine computer is automatically associated with the pristine server providing the file. Continuing to block 424, the definition of each new pristine computer is edited to add missing information (and to update information provided by the pristine server if necessary).

The process then merges at block 426, wherein the runtime parameters required for the installation of the operating system are entered. Continuing to block 428, one or more further roles can be assigned to the pristine computer (in addition to the pristine role defined by the corresponding attribute).

Whenever the synchronization engine is activated, a new action plan is generated at block 430. For each action of the plan (starting from the first one), the method verifies its type at block 432. If the action is of the pristine type the blocks 434-446 are executed, whereas if the action is of the software distribution type the blocks 448-452 are executed.

Considering in particular block 434 (pristine action), a test is made to determine whether the pristine computer is declared in the directory service (skipping the standard check of the existence of the corresponding endpoint computer). If not, the configuration manager at block 436 pre-stages the pristine computer in the directory service (for future use by the associated pristine server); more in detail, a new account is created for the pristine computer, and the pristine server is configured to serve requests received from the pristine computer. The flow of activity then continues to block 438. Conversely, if an account for the pristine computer is already available in the directory service the process descends into block 438 directly.

Considering now block 438, the configuration server retrieves information about the pristine computer (including its identifier, the associated pristine server, the image corresponding to the operating system element on that pristine server, and any runtime parameters). The process then passes to block 440, wherein a method is called (passing the retrieved information) on the configuration agent of the pristine server associated with the pristine computer (for example, via an ORB of the CORBA programming model installed on the corresponding gateway). In response thereto, the pristine server at block 444 creates a new response file for the image (copying the corresponding default response file). The new response file is then updated at block 445, replacing its variables with the respective runtime parameters received from the configuration server. Proceeding to block 446, the new response file is named according to the identifier of the pristine computer.

With reference now to block 448 (software distribution action), the planner verifies whether any dependencies of the action have been resolved. If not, the action is suspended at block 450 waiting for the completion of the dependent actions. Conversely, once all the dependencies have been resolved the action is executed at block 452, and the target database is updated accordingly.

As soon as the pristine computer is actually plugged in the system and turned on, the code of the remote bootstrap service is loaded at block 452. The pristine computer then broadcasts a request for a dynamic address at block 454. The request circulates within the domain of the pristine computer (being blocked by the corresponding gateway); once the dynamic address server has received the request, that server at block 456 offers a new address to the pristine computer.

The pristine computer then broadcasts a request for an operating system installation at block 458 (which request includes the identifier of the pristine computer). Once the pristine server has received the request, a test is made at block 460 to determine whether the pristine computer is declared in the directory service. If not, the pristine server at block 462 creates a new account for the pristine computer in the directory service; the method then ends at the concentric white/ black stop circles 464. Conversely, if an account for the pristine computer is already available in the directory service, the pristine server verifies at block 466 whether it is authorised to serve requests received from the pristine computer. If not, a security exception is logged at block 468; the method then ends at the stop circles 464.

When the pristine computer is defined and authorized a remote installation offer is returned to the pristine computer at block 468; the offer includes an address of the pristine server and the name of the first file required for starting the remote installation process (i.e., the bootstrap program). Continuing to block 470, the pristine computer requests the downloading of the bootstrap program to the pristine server. The request is received at block 472 by the negotiation layer of the pristine server, which instructs the transfer agent to send that file to the pristine computer. The completion of the downloading is indicated at block 474 by a message prompting the user of the pristine computer to start the remote installation process (for example, "Press F12 for network service boot"). If the user does not press the key F12 within a preset period (such as 3 seconds) the process ends at the stop circles 464.

On the other hand, if the user starts the remote installation process the pristine computer at block 476 requests the downloading of the installation wizard to the pristine server. The corresponding file is sent to the pristine computer at block 478. With reference now to block 480, the installation wizard guides the user of the pristine computer through a series of panels. Typically, the installation wizard includes standard panels for showing a welcome screen, allowing the user to log in using his/her credentials, to select a setup option and to choose an image among a list of images available for the user. In the proposed solution, the installation wizard has been customized to force the installation of the image associated with the pristine computer; for this purpose, the setup option panel ("Choice.osc") has been updated to include an additional option (which is the only one available when a user different from the administrator logs in the pristine computer).

Assuming that the user has selected that option, the pristine computer at block 481 requests the downloading of the image associated with its identifier to the pristine server (typically, after displaying a caution panel and a summary panel). Preferably, the process is now completely unattended, since all the variables of the response file have already been resolved during the execution of the pristine action. However, it is also feasible to allow the user to enter the values of some variables at runtime (which variables typically relate to personal options, such as a screen resolution). In this case, one or more panels prompt the user to enter the desired values for the corresponding variables; the pristine server replaces the variables in the response file with the entered values and creates a corresponding temporary response file, which is then used for the installation process. Considering now block 482, the desired image (with the associated response file) is downloaded to the pristine computer. The method continues to 483, wherein the image is then installed on the pristine computer; as a result, the target computer will be configured as an endpoint computer with the desired operating system and the configuration agent.

Moving to block 484, the configuration agent logs in the endpoint manager. In response thereto, the new endpoint computer is registered on the configuration server at block 486. As soon as the completion agent detects the log in of the new endpoint computer, a scan of the new endpoint computer is requested to the corresponding configuration agent at block 488. Passing to block 490, the result of the scan is returned to the configuration server from the new pristine computer. The configuration server at block 492 verifies whether the actual configuration of the new endpoint computer matches its definition in the target database; assuming that the result of the verification is positive, the completion of the pristine action is notified to the planner at block 493 (so as to enable any dependent software distribution actions); at the same time, the corresponding pristine attribute is updated to indicate that no operating system is to be installed (thereby avoiding any accidental overwriting).

A test is then made at block 494 to determine whether all the actions of the plan have been processed. If not, the method returns to block 432 to repeat the same operations for a next action. Conversely, the process ends at the stop circles 464.

Similar considerations apply if the program performs an equivalent method. In any case, the concepts of the present invention are also applicable when the pristine computers are associated with the images in a different way (for example, using equivalent configuration files), when the installation process is activated turning on the pristine computer remotely, and the like More generally, the present invention proposes a method of distributing software configurations in a data processing system. The method starts with the step of defining a configuration element for an operating system on a software distribution server; the configuration element is associated with an image of the operating system on one or more operating system installation servers. An action is further defined on the distribution server for applying the configuration element to one or more target computers. Each target computer is then associated with the image on one or more related installation servers in response to a submission of the action. The method further includes the step of installing the associated image on the target computer from a selected related installation server.

The devised solution provides a software distribution application that supports the installation of operating systems.

This result is achieved integrating the operating system installation application into the software distribution application. Therefore, it is possible to exploit any pre-existing installation application that is already available in the system. Moreover, the proposed solution provides an open and pluggable architecture that can host different installation applications.

The method of the invention abstracts the definition of the operating systems to be installed (hiding any dependency on physical characteristics of the corresponding images).

Moreover, the proposed solution allows exploiting the functions (already available in the software distribution application) for managing complex operations relating to the installation of the operating systems; for example, scheduling plans (with proper conditionings) can be generated for the configuration of the pristine computers, the pristine computers can be assigned to logic roles for subscribing to reference models, and the like.

The preferred embodiment of the invention described above offers further advantages.

Particularly, the pristine computers are defined in the target database (specifying the associated pristine server).

In this way, the pristine computers can be defined before they actually exist.

Advantageously, the configuration server declares the pristine computer in the global directory for enabling the installation of the operating system.

The proposed feature increases the security of the process.

A way to further improve the solution is to have the installation server declare any unknown computer into the global directory; the declaration is then imported into the configuration server.

Therefore, the need of typing information about the new pristine computers is strongly reduced.

However, the solution of the invention is also suitable to be implemented with a different declaration of the pristine computers, without the automatic declaration of the new pristine computers into the global directory, or without the possibility of importing the declaration of the pristine computers from the global directory.

As a further enhancement, any image is updated to embed the configuration agent.

Therefore, the computer is automatically configured to be manageable by the software distribution application.

Advantageously, the completion of the installation is detected when the new endpoint computer logs in the configuration server.

In this way, any software distribution actions (depending from the pristine action) can be enabled.

A way to further improve the solution is to scan the configuration of the new endpoint computer for a comparison with its definition in the target database.

This feature adds a further control on the compliance of the new endpoint computer to its desired configuration.

In any case, the method of the invention is also suitable to be carried out installing the operating system only, using a different mechanism for detecting the completion of the pristine actions (for example, polling the installation servers), or even without performing any verification of the configuration of the new endpoint computers.

In a specific implementation of the proposed solution, a new image is created on each installation server for the pristine computer by copying the corresponding response file.

In this way, the image is associated with the pristine computer in a very simple manner (and with a reduced waste of memory space).

As a further enhancement, the new response file is created resolving one or more variables according to the runtime parameters provided on the configuration server for the pristine computer.

The devised solution allows customizing the image for each computer.

A suggested choice for a user-interface of the installation application is to force the selection of the image associated with the pristine computer for any user that is logged in.

This feature ensures the installation of the correct image on the pristine computer automatically.

Alternatively, the pristine computer is associated with the images directly, the response file cannot be customized, or the selection of the image associated with the pristine computer is in addition to other available choices (such as for selecting the images associated with the user).

Advantageously, the solution according to the present invention is implemented with a computer program, which is provided as a corresponding product stored on a suitable medium. Preferably, the solution consists of a component that is installed on the configuration server and a component that is installed on each installation server; the different components are suitable to be implemented separately and put on the market even as stand-alone products.

Alternatively, the program is pre-loaded onto the hard-disks, is sent to the computers through a network (typically the INTERNET), is broadcasted, or more generally is provided in any other form directly loadable into a working memory of the computers. However, the method according to the present invention leads itself to be carried out with an application having a different architecture, with a hardware structure (such as integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A computer program product comprising a non-transitory computer readable storage medium having a computer readable program stored thereon, wherein the computer readable program, when executed in a data processing system, causes the data processing system to:

define a configuration element for an operating system, wherein the configuration element is an operating system element that specifies properties of the operating system on a pristine server;

define an action plan for applying the configuration element to a pristine target computer;
associate the pristine target computer with an image of the operating system on the pristine server in response to a submission of the action plan such that the pristine server installs the associated image of the operating system and a configuration agent on the pristine target computer to form an endpoint target computer;
define at least one further action for installing a software product on each endpoint target computer,
detect a connection of the configuration agent of the endpoint target computer to the configuration server,
enable submission of the at least one further action in response to detection of the connection, and
instruct the configuration agent of the endpoint target computer to install the corresponding software product in response to a submission of the at least one further action.

2. The computer program product according to claim 1, wherein the computer readable program further causes the data processing system to:
define a hardware identifier for each pristine target computer on the configuration server, and
associate the pristine server and the configuration element with the hardware identifier.

3. The computer program product according to claim 2, wherein the configuration server is configured to declare and authorize the pristine target computer in a global directory,
wherein the pristine server is configured to verify whether the pristine target computer is defined and authorized, and
wherein the pristine server is configured to enable the installation of the associated image on the pristine target computer in response to a positive verification of the authorization.

4. The computer program product according to claim 3, wherein the pristine server is configured to declare the pristine target computer in the global directory in response to a negative verification of the declaration, and
wherein the configuration server is configured to import the declaration of the pristine target computer from the global directory for defining the hardware identifier.

5. The computer program product according to claim 1, wherein the computer readable program further causes the data processing system to, under the control of the configuration server:
instruct the configuration agent to scan a configuration of the endpoint target computer in response to detection of the connection, and
verify whether the configuration corresponds to a respective hardware identifier.

6. The computer program product according to claim 1, wherein each operating system image is associated with at least one configuration file for providing runtime parameters, wherein associating the pristine target computer with the image on the pristine server comprises:
creating a new configuration file for the image, and
associating the new configuration file with the pristine target computer.

7. The computer program product according to claim 6, wherein a standard response file including at least one variable is associated with the image, wherein the computer readable program further causes the data processing system to, under the control of the configuration server:
associate a value for at least one selected variable with a hardware identifier of the pristine target computer, and wherein the step of creating the new configuration file comprises:
copying a standard configuration file, and
resolving the at least one selected variable with the hardware identifier.

8. The computer program product according to claim 6, wherein the computer readable program further causes the data processing system to, under the control of the pristine server:
force a user logged on the pristine target computer to select the associated response file.

9. An apparatus distributing software configurations, comprising:
a configuration server data processing system; and
a computer readable medium storing instructions, wherein the instructions, when executed by the configuration server data processing system, cause the configuration server data processing system to implement:
a configuration manager that is configured to receive a configuration element for an operating system, wherein the configuration element is an operating system element that specifies properties of the operating system on a pristine server;
a sync engine that is configured to define an action plan for applying the configuration element to a pristine target computer; and
an execution manager that is configured to associate the pristine target computer with an image of the operating system on the pristine server in response to a submission of the action plan such that the pristine server installs the associated image of the operating system and a configuration agent on the pristine target computer to form an endpoint target computer,
wherein the configuration manager is configured to embed a configuration agent for interacting with the configuration server data processing system into each operating system image to be installed on a pristine target computer; and
wherein the sync engine is configured to define at least one further action for installing a software product on each endpoint target computer, wherein the instructions, when executed by the configuration server data processing system, further cause the configuration server data processing system to implement:
an endpoint manager that is configured to detect a connection of the configuration agent of the endpoint target computer to the configuration server data processing system, to enable submission of the at least one further action in response to detection of the connection, and to instruct the configuration agent of the endpoint target computer to install the corresponding software product in response to a submission of the at least one further action.

10. The apparatus of claim 9, wherein the execution engine is further configured to define a hardware identifier for each pristine target computer and associate the pristine server and the configuration element with the hardware identifier.

11. The apparatus of claim 10, wherein the execution engine is further configured to declare and authorize the pristine target computer in a global directory, wherein the pristine server is configured to verify whether the pristine target computer is defined and authorized and to enable the installation of the associated image on the pristine target computer in response to a positive verification of the authorization.

12. The apparatus of claim 11, wherein the pristine server is configured to declare the pristine target computer in the global directory in response to a negative verification of the declaration and wherein the execution manager is configured to import the declaration of the pristine target computer from the global directory for defining the hardware identifier.

13. The apparatus of claim 9, wherein the endpoint manager is further configured to instruct the configuration agent to scan a configuration of the endpoint target computer in response to detection of the connection and to verify whether the configuration corresponds to a respective hardware identifier.

14. The apparatus of claim 9, wherein each operating system image is associated with at least one configuration file for providing runtime parameters, wherein associating the pristine target computer with the image on the pristine server comprises:
creating a new configuration file for the image; and
associating the new configuration file with the pristine target computer.

15. A configuration server for distributing software configurations in a data processing system, comprising:
a processor; and
a memory coupled to the processor, wherein the memory comprises instructions which, when executed by the processor, cause the processor to:
define a configuration element for an operating system, wherein the configuration element is an operating system element that specifies properties of the operating system on a pristine server;
define an action plan for applying the configuration element to a pristine target computer; and
associate the pristine target computer with an image of the operating system on the pristine server in response to a submission of the action plan such that the pristine server installs the associated image of the operating system and a configuration agent on the pristine target computer to form an endpoint target computer.

16. A method for distributing software configurations in a data processing system, the method comprising:
defining, by a configuration server, a configuration element for an operating system, wherein the configuration element is an operating system element, stored in a repository at the configuration server, that specifies properties of the operating system on a pristine server, wherein the pristine server is selected from a set of one or more target computers and wherein a database at the configuration servers stores information about the set of one or more target computers;
defining, by the configuration server, an action plan on the configuration server for applying the configuration element to a pristine target computer;
submitting the action plan from the configuration server to the pristine server; and
associating, by the pristine server, the pristine target computer with an image of the operating system in response to submission of the action plan, such that the pristine server installs the associated image of the operating system and a configuration agent on the pristine target computer to form an endpoint target computer.

17. The method according to claim 16, further comprising:
defining a hardware identifier for each pristine target computer on the configuration server; and
associating the pristine server and the configuration element with the hardware identifier.

18. The method according to claim 16, wherein each operating system image is associated with at least one configuration file for providing runtime parameters, wherein associating the pristine target computer with the image on the pristine server comprises:
creating a new configuration file for the image, and
associating the new configuration file with the pristine target computer.

19. A computer program product comprising a non-transitory computer readable storage medium having a computer readable program stored thereon, wherein the computer readable program, when executed in a data processing system, causes the data processing system to:
define a configuration element for an operating system on a configuration server, wherein the configuration element is an operating system element that specifies properties of the operating system on a pristine server;
define an action plan on the configuration server for applying the configuration element to a pristine target computer; and
associate the pristine target computer with an image of the operating system on the pristine server in response to a submission of the action plan, such that the pristine server installs the associated image of the operating system and a configuration agent on the pristine target computer to form an endpoint target computer.

* * * * *